United States Patent [19]
Sato et al.

[11] 3,943,263
[45] Mar. 9, 1976

[54] PREPARATION OF SOY-EXTENDED FRANKFURTERS AND OTHER CURED MEAT PRODUCTS HAVING IMPROVED COLOR

[75] Inventors: Kunito Sato, Chicago, Ill.; Leonard H. Roberts, Ellisville, Mo.

[73] Assignee: Armour and Company, Phoenix, Ariz.

[22] Filed: Feb. 12, 1975

[21] Appl. No.: 549,212

[52] U.S. Cl. .............. 426/250; 426/105; 426/266; 426/540; 426/646; 426/656
[51] Int. Cl.² ........................................... A23L 1/27
[58] Field of Search ........... 426/105, 135, 250, 266, 426/265, 268, 540, 646, 641, 656, 520; 8/1, 14, 25, 53, 76

[56] References Cited
UNITED STATES PATENTS

| | | | |
|---|---|---|---|
| 2,521,101 | 9/1950 | Thor | 426/250 |
| 3,528,822 | 9/1970 | Borenstein | 426/250 |
| 3,873,740 | 3/1975 | Terrell | 426/266 |

FOREIGN PATENTS OR APPLICATIONS

| | | | |
|---|---|---|---|
| 918,399 | 2/1963 | United Kingdom | 426/250 |
| 4,642,578 | 1971 | Japan | 426/265 |

OTHER PUBLICATIONS

Hackh's Chemical Dictionary – 4th Ed. Grant, McGraw–Hill, 9/74, N.Y., p. 95.

*Primary Examiner*—Norman Yudkoff
*Assistant Examiner*—Hiram H. Bernstein
*Attorney, Agent, or Firm*—Frank T. Barber; Carl C. Batz; Richard R. Mybeck

[57] ABSTRACT

A process for preparing cured comminuted meat products in which a soy protein material is incorporated therein and in which the meat and soy protein material is mixed along with sodium nitrite and colorants including betanin and canthaxanthin; and a cured meat product so prepared.

10 Claims, No Drawings

PREPARATION OF SOY-EXTENDED FRANKFURTERS AND OTHER CURED MEAT PRODUCTS HAVING IMPROVED COLOR

This invention relates to the preparation of cured soy-extended comminuted meat products having improved color, and more particularly to the preparation of such soy-extended products containing sodium nitrite and the colorants betanin and canthaxanthin.

BACKGROUND OF THE INVENTION

Cured meat products such as frankfurters containing sodium nitrite curing agents commonly have a pink color which is considered desirable. It would also be desirable if soy protein materials could be combined with meat to provide a very satisfactory combined product. However, when soy materials have heretofore been combined along with meat such as in the production of a soy-extended frankfurter, the result is that the color becomes very pale pink, a color which is not desirable. In order to overcome this disadvantage, it has been proposed to stuff the soy-extended frankfurters into casings which have been dyed a red color. But a disadvantage of such practice is that while the dye from the casing penetrates into the meat surface, the central part of the frankfurter remains pale pink, and when the frankfurter is cut it has a two-tone effect which is undesirable. Further, the dye from the casing leaches into the cooking water which is aesthetically unappealing to the housewife.

The problem is further complicated due to the fact that the sodium nitrite enters into the production of the color and any colorants must function along with the sodium nitrite in this respect.

SUMMARY OF THE INVENTION

We have discovered that by utilizing the coloring agents betanin and canthaxanthin along with sodium nitrite in the preparation of soy-extended meats, it is possible to obtain a uniform pink color which resembles the pink color of cured meats containing only sodium nitrite without soy extender. We believe that canthaxanthin and betanin in some way interact with sodium nitrite or the nitroso-pigment during processing to produce the enhanced cured color of soy-extended meats which is superior to that formed by the action of sodium nitrite alone.

DETAILED DESCRIPTION

We may utilize the present invention especially in connection with frankfurters, but also in connection with bologna, luncheon loaf, cured sausages, salami, and other such cured meat products.

A typical formulation of meat for use in preparing frankfurters would be:
  70 pounds boneless beef plates
  20 pounds lean picnic trimmings
  10 pounds regular pork trimmings
Total 100 pounds of meat A typical formulation of meat for use in preparing bologna would be:
  68 pounds boneless beef plates
  21 pounds lean picnic trimmings
  11 pounds beef hearts
Total 100 pounds of meat A typical formulation of meat for use in preparing salami would be:
  46 pounds boneless beef plates
  31 pounds pork picnic trimmings
  23 pounds pork hearts
Total 100 pounds of meat The soy protein material may be a soy protein isolate, texturated vegetable protein, soy protein concentrate, soy flour, soy grits, or the like. We prefer to use the isolates which contain about 90% protein. From a functional point of view, the isolates are myosin-like in nature. They are both emulsifiers and binders with gelation properties contributing to the textural properties of the cured meat product.

The percentage of meat protein which may be replaced by soy protein may vary between wide limits, with a lower amount being about 15% and a maximum practical amount being about 60 or 70%, with about 30 to 50% preferred. The percentage weight of the soy protein isolate may vary, as a practical matter, between about 2% and 30% of the weight of the meat, the soy material being substantially dry, and the meat containing its natural moisture, with a preferred range of about 2 to 15%.

The sodium nitrite curing agent may be employed in an amount of from about 10 to 200 ppm by weight, based on the substantially dry weight of the sodium nitrite and the meat containing its natural moisture, with about 20 to 150 ppm being preferred.

Suitably, the usual small amount of sodium-erythorbate may be included as an ingredient along with the sodium nitrite.

The special coloring agents which we employ include a betanin material which may come in a water-soluble syrup which is nearly flavorless and which contains also sugars and other solids from red beets. The betanin material is included in an amount of from about 0.5 to 50 ppm based on the weight of the betanin in the material and the weight of the meat containing its natural moisture, with about 0.3 to 3.5 ppm being preferred.

The canthaxanthin ingredient may be added in the form of a mixture called Roxanthin Red 10 which is a warmwater dispersible, free flowing, mixture containing about 10% canthaxanthin in a matrix of gelatin, vegetable oil, sugar and starch. This ingredient may be added in the amount of about 2.0 to 440 ppm based on the weight of canthaxanthin contained and the weight of the meat containing its natural moisture, with about 4 to 35 ppm being preferred.

The above-described ingredients may be used to form the improved mixture. Desirably the meat may first be ground as through a three-sixteenths-inch plate and the ground meat placed in a mixer or chopper, followed by addition of salt, sugar, spices and the sodium nitrite. The usual amount of sodium erythorbate may be included. About 50–60 lbs. of ice water to 100 lbs. of meat may be utilized and some of the water may be added at this point. The betanin is dissolved in a part of the remaining water and the canthaxanthin is suspended in water which has been warmed, and these colorants are added to the mixture.

After further chopping or mixing, the dry soy protein material is added along with the remaining water. This mixture is then processed into finished product in accordance with established procedures.

Alternately, the meats, salt, sugar, spices and ice may be added to a mixer. Then we may add the colorants dispersed in water and continue mixing. The soy protein material may be added followed by the remainder of the ice water. The sodium nitrite and erythorbate dispersed in water may then be added and mixing continued until the desired temperature is reached.

Another procedure is to prepare a water suspension of the two colorants. Then add the colorant mixture to the soy protein material and mix thoroughly. Then add the colored soy protein material to the ground meat mixture and continue mixing.

The calculated proximate analysis of finished soy-extended frankfurter meat based on 10% smokehouse loss may be as follows:

| | |
|---|---|
| Percent meat protein | 7.69 |
| Percent soy protein | 5.61 |
| Total protein | 13.30% |
| Percent fat | 28.1 |

The above analysis contemplates a 42.2% replacement of meat protein with soy protein.

The emulsions prepared by any of the abovedescribed procedures may be stuffed into casings and treated by conventional smokehouse processing procedures where they obtain an internal temperature of about 155°F or above, suitably between about 155° and 160°F. The frankfurters so processed may then be packaged and shipped to the trade.

We find that the frankfurters which have been subjected to the method of preparation above described have, after they have been subjected to the heat treatment, a red or pink color (the hue of the color depending somewhat on the colorant levels) which is significantly superior to the pale pink color which has heretofore been associated with soy-extended frankfurters.

We compared the color of the frankfurters made using sodium nitrite without colorants with frankfurters made using the colorants and without sodium nitrite; also, with frankfurters made with our special colorants and sodium nitrite in different amounts, and the results of such tests is given in Table I.

TABLE I

SUBJECTIVE COLOR EVALUATION OF SOY FRANKFURTERS AFTER SMOKING AND HEAT PROCESSING: EFFECT OF COLORANT LEVEL

| | Color | |
|---|---|---|
| Treatment | Exterior | Interior |
| Betanin (3.8 ppm) + canthaxanthin (18 ppm) | brown-red | brown-red |
| Betanin (3.8 ppm) + canthaxanthin (18ppm) + sodium nitrite (140 ppm) | red-brown | pink |
| Betanin (7.6 ppm) + canthaxanthin (18 ppm) + sodium nitrite (140 ppm) | red-brown | intense pink |
| Sodium nitrite (140 ppm) | pale brown | pale pink |

It is evident from results outlined in Table I that the combined use of betanin and canthaxanthin plus sodium nitrite produces a cured color significantly superior to that produced by either the combined betanin and canthaxanthin or the sodium nitrite when used alone. It can also be noted from Table I that a slight increase in betanin level produces a considerably more intense color. Variation in sodium nitrite level also has a definite influence on resultant color intensity as can be seen from Table II.

TABLE II

SUBJECTIVE COLOR EVALUATION OF SOY FRANKFURTERS AFTER SMOKING AND HEAT PROCESSING: EFFECT OF COLORANTS AT LOW AND HIGH SODIUM NITRITE LEVEL

| Treatment | Interior Color |
|---|---|
| Betanin (12 ppm) + canthaxanthin (20 ppm) | brown-red |
| Betanin (12 ppm) + canthaxanthin (20 ppm) + sodium nitrite (20 ppm) | pink |
| Betanin (12 ppm) + canthaxanthin (20 ppm) + sodium nitrite (140 ppm) | intense pink |
| Sodium nitrite (140 ppm) | pale pink |

The level of the colorants and the sodium nitrite may therefore be selected within the limits stated to give the desired color intensity but the combined use of our special colorants and sodium nitrite remains essential to the successful production of our improved cured color in soy-extended meat products.

We also subjected the improved colored frankfurters to tests in which they were subjected to prolonged illumination. Although the betanin pigment is itself subject to degradation by light, and oxidation of canthaxanthin is known to be accelerated by light, we found that after 25 days' exposure to light in a retail display case, the improved frankfurters prepared as herein described still retained their color and were significantly preferred over frankfurters made with sodium nitrite alone and over frankfurters prepared using the combined colorants without sodium nitrite.

Taste panel evaluation established that there is no significant difference in the flavor of the improved frankfurters over those in which our special colorants were not included. To determine the influence of betanin and canthaxanthin when used along with sodium nitrite we subjected samples to a 30 days' storage test and found that bacterial growth when using betanin and canthaxanthin along with sodium nitrite was the same as when using sodium nitrite alone.

EXAMPLE I — SOY-EXTENDED FRANKFURTERS 35 pounds of boneless beef plates, 10 pounds of lean picnic trimmings and 5 pounds of regular pork trimmings were coarse ground and placed in a mixer.

An aqueous mixture of the colorants betanin and canthaxanthin was prepared using 40 grams of Nature's Red B-20 food color and 4.0 grams Roxanthin Red 10 in one pound of water. The aqueous mixture of colorants was added to the mixer containing the meat. To this mixture was also added 3.2 pounds of spice, 1.5 pounds of sugar, 2 pounds of common salt, 0.2 pounds of sodium erythorbate, 0.08 pounds of sodium nitrite cure mixture and 9 pounds of ice.

The resultant concentration of canthaxanthin was 18 ppm; the concentration of betanin was 3.5 ppm; and the concentration of sodium nitrite was 140 ppm. These concentrations were by weight of the colorants and based on the weight of the meats containing their natural juices.

The entire mixture was machine mixed for 2 to 3 minutes after which 5.0 pounds of soy protein isolate material was added, followed by 17 pounds of cold water.

The emulsion was formed by passing the meat-soy protein mixture twice through a 1.7 mm plate in a Mince Master mixer.

The emulsion was stuffed into cellulose casings, linked, and heat processed in an Alkar smokehouse to an internal temperature of 155°F. The soy-frankfurters were cold water showered, stored at 38°F and the casings removed.

When the frankfurters had been heat processed and treated as above described, they were found to have a uniform, intense pink interior color which was evaluated as being significantly superior to conventional soy-extended frankfurters prepared using sodium nitrite but without betanin and canthaxanthin.

EXAMPLE II — SOY-EXTENDED BOLOGNA

To 25 pounds of coarse ground meats consisting of 17.0 pounds boneless beef plates, 5.25 pounds lean picnic trimmings and 2.75 pounds beef hearts in a mixer were added 0.98 pounds salt, 2.42 pounds sugar, 0.3 pounds spice, 0.01 pounds sodium erythorbate, 0.04 pounds sodium nitrite cure mixture, and 9.25 pounds ice water.

While mixing the above materials there was added an aqueous mixture of the two colorants, consisting of 10 grams of Nature's Red B-20 food color and 1.0 grams Roxanthin Red 10 in one pound of water. This was followed immediately by the addition of 2.5 pounds of soy protein isolate and 2 pounds of ice.

The resultant concentration of canthaxanthin was 8.8 ppm; the concentration of betanin was 1.8 ppm; and the concentration of sodium nitrite was 140 ppm. These concentrations were by the dry weights of the colorants and sodium nitrite, and on the basis of the meat containing its natural juices.

The emulsion was formed by passing the meat mixture through a 1.7 mm plate in a Mince Master mixer. The emulsion was stuffed into pre-stuck fibrous casings and heat processed to an internal temperature of 155°F.

It was found that when the soy bologna had been heat processed and treated in the foregoing described manner, the soy-extended bologna slices had a uniform, intense pink or red color. This enhanced pink or red color was evaluated to be superior to the pale pink color which has heretofore been associated with conventional soy-extended bologna prepared with sodium nitrite but without the addition of the colorants betanin and canthaxanthin.

EXAMPLE III - SOY-COOKED SALAMI

To 25 pounds of coarse ground meats consisting of 11.5 pounds boneless beef plates, 7.75 pounds pork picnic trimmings and 5.75 pounds pork hearts in a mixer there was added 0.84 pounds salt, 0.84 pounds sugar, 1.44 pounds spice, 0.03 pounds sodium nitrite cure mixture, and 8.75 pounds ice water.

While mixing the above, there was added an aqueous mixture of the colorants betanin and canthaxanthin consisting of 10 grams Nature's Red B-20 food color and one gram Roxanthin Red 10. This was followed by the addition of 2.9 pounds of soy protein isolate. The resultant concentration of canthaxanthin was 8.8 ppm; the concentration of betanin was 1.8 ppm; and the concentration of sodium nitrite was 140 ppm. These concentrations were based on the dry weights of the canthaxanthin, betanin and sodium nitrite and based on the weight of the meat containing its natural juices.

After further mixing, the meat mixture was reground through a three-sixteenths inch plate.

The resulting fine ground product was stuffed into fibrous casings and heat processed to an internal temperature of 155°F.

When the soy-cooked salami had been heat processed and treated in the foregoing manner, it was found that the salami slices had a uniform pink-red or red color. This pink-red or red color was evaluated to be significantly superior to the pale pink color which has heretofore been associated with soy-cooked salami prepared with sodium nitrite but without the addition of the colorants betanin and canthaxanthin.

While we have described in detail certain embodiments of our invention, it is to be understood that the invention may be varied widely and may embrace many combinations and amounts of colorant ingredients, etc., and may be changed in many respects. All such changes and variations are to be considered within the spirit of the invention and within the scope of the appended claims.

We claim:

1. In a process for preparing a soy-extended cured meat product in which a soy protein material is combined with meat, the improvement comprising mixing said protein material and said meat in the presence of sodium nitrite, betanin, and canthaxanthin to thereby impart to said mixture an improved color wherein said sodium nitrite is contained in said mixture in an amount of from 10 to 200 ppm, said betanin is contained in said mixture in an amount of from 0.5 to 50 ppm, and said canthaxanthin is contained in said mixture in an amount of from 2.0 to 440 ppm, each of said percentages being based on the dry weight of the colorant and the natural weight of the meat.

2. A process as set forth in claim 1 in which said protein material is a soy isolate containing about 90% protein.

3. A process as set forth in claim 1 in which said soy protein material is included in said mixture in the amount of from about 2 to 30% based on the dry weight of the soy protein material and the natural weight of the meat.

4. A process as set forth in claim 1 including mixing said meat in comminuted form with said sodium nitrite, adding to the meat and nitrite mixture said betanin in water solution and said canthaxanthin in water suspension and adding to said mixture said soy protein material.

5. A process as set forth in claim 1 including mixing spices and said colorants into said meat, and adding said soy protein material and said sodium nitrite to the mixture so formed.

6. A process as set forth in claim 1 which includes the steps of adding said colorants to water, adding said water containing said colorants to said soy protein material, and adding said soy protein material containing said colorants to said meat.

7. A process as set forth in claim 1 including the steps of stuffing mixture into a casing and heating the stuffed casing to an internal temperature of above about 155°F.

8. A food comprising a mixture of cured meat and a soy protein material which contains sodium nitrite in an amount of from 10 to 200 ppm, betanin in an amount of from 0.5 to 50 ppm, canthaxanthin in an amount of from 2.0 to 440 ppm, said percentages being by weight based on the dry weight of said sodium nitrite, betanin and canthaxanthin, and on the natural weight of said meat.

9. A food as set forth in claim 8 in which said soy protein material is contained in said mixture in an amount of from 2 to 30%, said percentage being based on the dry weight of said soy protein material and the total weight of the combined mixture.

10. A process as set forth in claim 1 including the step of heating said mixture containing sodium nitrite, betanin and canthaxanthin to a temperature of from about 155° to 160°F.

\* \* \* \* \*